(12) United States Patent
Ash et al.

(10) Patent No.: US 10,216,429 B2
(45) Date of Patent: Feb. 26, 2019

(54) PERFORMING POST-PROCESSING OPERATIONS FOR LOG FILE WRITES

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 14/751,725

(22) Filed: Jun. 26, 2015

(65) Prior Publication Data

US 2016/0378369 A1    Dec. 29, 2016

(51) Int. Cl.
*G06F 7/00*    (2006.01)
*G06F 3/06*    (2006.01)
*G06F 11/14*    (2006.01)
*G06F 11/00*    (2006.01)

(52) U.S. Cl.
CPC ............ *G06F 3/0619* (2013.01); *G06F 3/065* (2013.01); *G06F 3/0655* (2013.01); *G06F 3/0665* (2013.01); *G06F 3/0685* (2013.01); *G06F 11/00* (2013.01); *G06F 11/1435* (2013.01); *G06F 11/1471* (2013.01)

(58) Field of Classification Search
CPC ................................................. G06F 17/30185
See application file for complete search history.

(56) References Cited

U.S. PATENT DOCUMENTS

| | | |
|---|---|---|
| 5,297,258 A | 3/1994 | Hale et al. |
| 5,581,750 A | 12/1996 | Haderle et al. |
| 5,835,955 A | 11/1998 | Dornier et al. |
| 6,141,731 A | 10/2000 | Beardsley et al. |
| 2006/0036660 A1* | 2/2006 | Lynn ................ G06F 17/30368 |
| 2009/0005987 A1 | 1/2009 | Vengroff et al. |
| 2012/0191908 A1 | 7/2012 | North et al. |
| 2012/0284459 A1 | 11/2012 | Gill |
| 2014/0108839 A1 | 4/2014 | Horikawa |
| 2014/0279917 A1 | 9/2014 | Minh et al. |
| 2016/0378369 A1 | 12/2016 | Ash et al. |

OTHER PUBLICATIONS

U.S. Appl. No. 14/751,703, filed Jun. 26, 2015.
Office Action dated Apr. 7, 2017, pp. 18, for U.S. Appl. No. 14/751,703, filed Jun. 26, 2015.

(Continued)

*Primary Examiner* — Ajith Jacob
(74) *Attorney, Agent, or Firm* — Rabindranath Dutta; Konrad Raynes Davda & Victor LLP

(57) ABSTRACT

A storage controller receives one or more host writes to a log file. A track is allocated to the log file. In response to completion of the one or more host writes to the log file, a determination is made that the track has remaining space. Data structures are reserved to avoid releasing the track having the remaining space to accommodate potential future writes to the log file in the remaining space of the track.

24 Claims, 12 Drawing Sheets

(56) References Cited

OTHER PUBLICATIONS

Response dated Jul. 7, 2017, pp. 18, to Office Action dated Apr. 7, 2017, pp. 18, for U.S. Appl. No. 14/751,703, filed Jun. 26, 2015.
Notice of Allowance dated Aug. 22, 2017, pp. 12, for U.S. Appl. No. 14/751,703, filed Jun. 26, 2015.
U.S. Appl. No. 15/814,121, filed Nov. 15, 2017.
List of IBM Patents or Patent Applications Treated as Related, dated Nov. 17, 2017, pp. 2.
Office Action dated Oct. 1, 2018, pp. 28, for U.S. Appl. No. 15/814,121.

* cited by examiner

PERFORMING POST-PROCESSING OPERATIONS FOR LOG FILE WRITES

BACKGROUND

1. Field

Embodiments relate to the performing of post-processing operations for log file writes.

2. Background

A storage controller may be coupled to one or more of a plurality of hosts. A storage management application that executes in the storage controller may manage a plurality of storage devices, such as disk drives, tape drives, flash drives, etc., that are coupled to the storage controller. The plurality of hosts may access data stored in the storage devices via the storage controller.

Host applications that execute in the plurality of hosts may create logical storage volumes, and subsequent to the creation of the logical storage volumes write to logical addresses of the logical volumes. The host applications may also read from logical addresses of the logical storage volumes.

One or more log files may be maintained in the storage controller, where a log file is a file that may record events, transactions, etc., that may occur within the storage controller or that may occur under the control of the storage controller or the host. The log file may also record events, transactions, etc., that are communicated to the storage controller. For example, event logs stored in the log file may record events that take place in the execution of a system in order to provide an audit trail that may be used to understand the activity of the system and to diagnose problems. Transaction logs stored in the log file may record changes to the stored data to allow a database system to recover from crashes or other data errors and maintain the stored data in a consistent state. Database systems usually have both general event logs and transaction logs. Many other types of data may be stored in the one or more log files that are maintained in the storage controller. The processing of log files and the performing of operations on the log file may take a significant amount of time.

SUMMARY OF THE PREFERRED EMBODIMENTS

Provided are a method, a system, a storage controller, and a computer program product in which a storage controller receives one or more host writes to a log file. A track is allocated to the log file. In response to completion of the one or more host writes to the log file, a determination is made that the track has remaining space. Data structures are reserved to avoid releasing the track having the remaining space to accommodate potential future writes to the log file in the remaining space of the track. As a result, the overhead of repeated release and reacquisition of tracks with empty space is avoided.

In certain embodiments, the data structures represent control blocks and other resources for the track.

In further embodiments, the reserving is for a predetermined period of time.

In additional embodiments, post-processing operations are performed on the log file.

In certain embodiments, the post-processing operations comprise periodically destaging contents of the log file from cache and non-volatile storage, in response to hardening of data in the log file without waiting for a destage processor to execute. As a result, the cache and non-volatile storage may preferentially be destaged of the contents that are hardened in the log file.

In additional embodiments, the post-processing operations further comprise performing consistent asynchronous replication of the log file without waiting for a replication application to execute. As a result, the valuable data of the log file is replicated prior to other data.

In yet further embodiments, the post-processing operations further comprise periodic or real-time selection of information in the log file to send the selected information for further processing. As a result, privacy of data may be assured and processes are not burdened with unnecessary data.

In certain embodiments, the post-processing operations on the log file is terminated in response to the elapse of a predetermined amount of time; or if a task with a higher level of priority than the post-processor operations needs a resource that is locked by the post-processing operations; or in response to an error recovery or a transition of the storage controller. As a result, the post-processing operations do not unnecessarily prevent resources from being used by other processes in certain situations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made, Certain embodiments provide mechanisms for performing post-processing operations on log files. On completion of writes to a log file, control blocks and other resources for a track with remaining space are reserved for a predetermined period of time to avoid the overhead for releasing the track and then reacquiring the track in case of subsequent writes to the log file.

In certain embodiments, post-processing operations are performed on the log file, where the post-processing operations comprise: periodically destaging contents of the log file from cache and non-volatile storage, in response to hardening of data in the log file without waiting for a destage processor to execute; performing consistent asynchronous replication of the log file without waiting for a replication application to execute; and periodic or real-time selection of information in the log file to send the selected information for further processing.

Exemplary Embodiments

Figure 1:
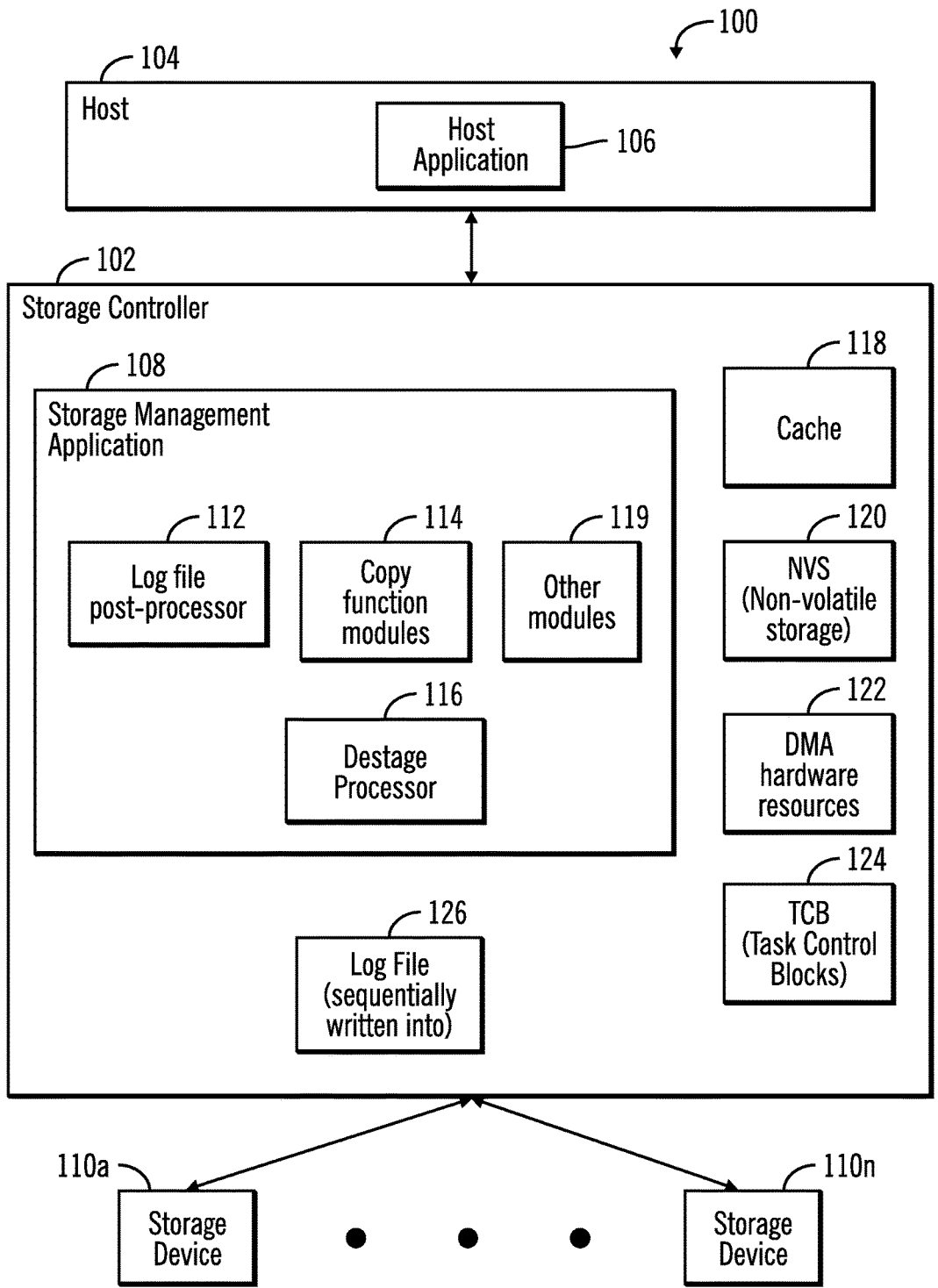
FIG. 1 illustrates a block diagram of a computing environment comprising a storage controller coupled to a host, where the storage controller includes log file post-processor, in accordance with certain embodiments.

FIG. 1 illustrates a block diagram of a computing environment 100 comprising a storage controller 102 coupled to a host 104 via a network or a direct link, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a suitable network such as the Internet, an intranet, a storage area network, etc. A host application 106 executes in the host 104 and a storage management application 108 executes in the storage controller 102, where the host application 106 and the storage management application 108 may be implemented in software, hardware, firmware or any combination thereof.

The storage controller 102 controls access to one or more storage devices 110a ... 110n that are coupled to the storage controller 102. The storage devices 110a ... 110n may include any suitable storage devices such as magnetic disk drives, tape drives, solid state drives (i.e., flash drives), etc.

The storage management application 108 may include a log file post-processor 112, one or more copy function modules 114, a destage processor 116, and other modules 119, where the modules 112, 114, 116, 119 may spawn processes or tasks under the control of the storage management application 108. The copy function modules 114 may periodically perform asynchronous or synchronous remote copy of data between storage controllers, and the destage processor 116 may periodically destage data from the cache 118 and NVS 120.

The storage controller 102 also includes a cache 118, a non-volatile store (NVS) 120, direct memory access (DMA) hardware resources 122, and task control blocks (TCB) 124. The cache 118 and the NVS 120 may comprise storage with lower latency (i.e., higher speed) in comparison to the storage devices 110a ... 110n. The NVS 120 may retain data even in the event of a power outage and may store a copy of the cache 118 or some other data. The DMA hardware resources 122 allow certain hardware subsystems to access main system memory of the storage controller 102 independently of the central processing unit (CPU) of the storage controller 102. The TCBs 124 are data structures corresponding to processes or tasks that execute in the storage controller 102 for performing writes, copies, staging to cache, destaging from cache, and other operations.

The storage controller 102 stores a log file 126 that is sequentially written into.

In certain embodiments, the storage controller 102 may receive write requests from the host application 106 to write to the log file 126. The write requests may also be generated internally by the storage controller 102. The storage management application may write data into the log file 126 in response to the write requests from the host application 106.

In certain embodiments, the log file post-processor 112 which is an application implemented in software, firmware, hardware or any combination thereof perform the post-processing of the log file 126.

Figure 2:
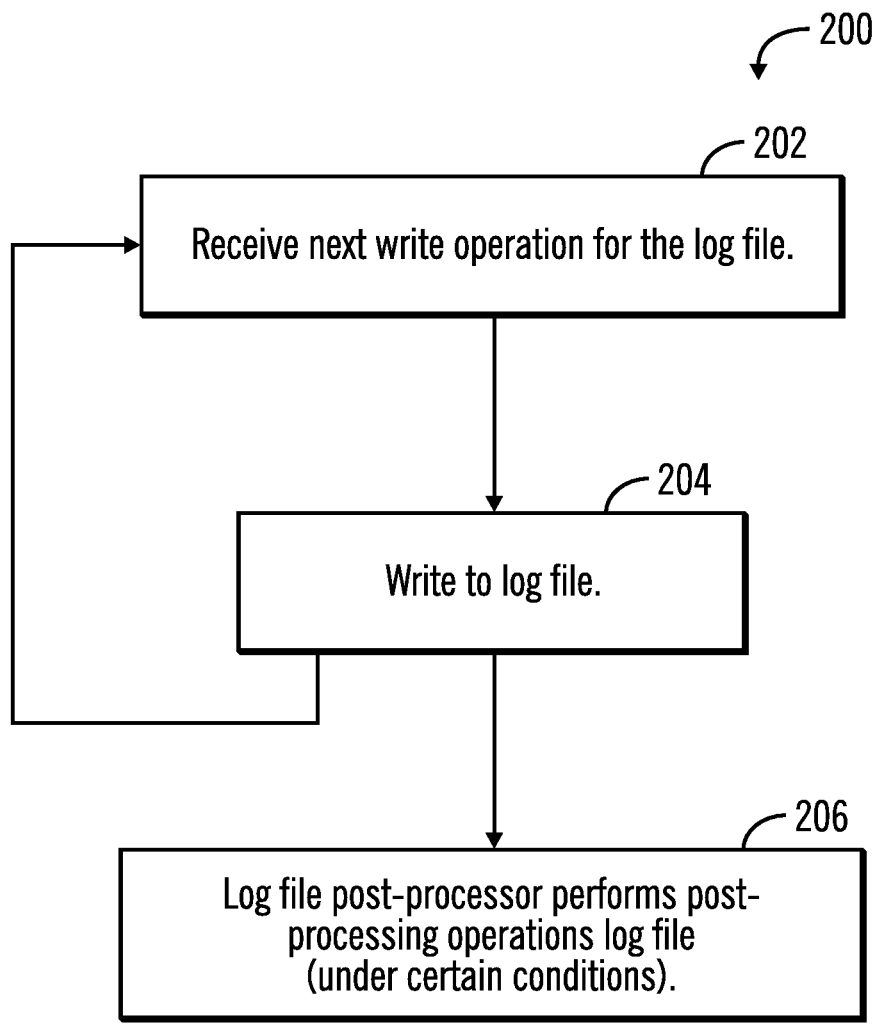
FIG. 2 illustrates a flowchart that shows operations for post-processing a log file, in accordance with certain embodiments.

FIG. 2 illustrates a flowchart 200 that shows operations for post-processing a log file 126, in accordance with certain embodiments. The operations shown in FIG. 2 may be performed by the storage management application 108 that executes in the storage controller 102.

Control starts at block 202 in which the storage management application 108 receives a next write operation for writing to the log file 126. The data is written (at block 204) to the log file 126 and control returns to block 202. From block 204, control also proceeds to block 206 in which after the hardening (i.e., finalization) of data in the log file 126, the log file post-processor 112 performs post-processing operations on the log file 126 under certain conditions.

Figure 3:
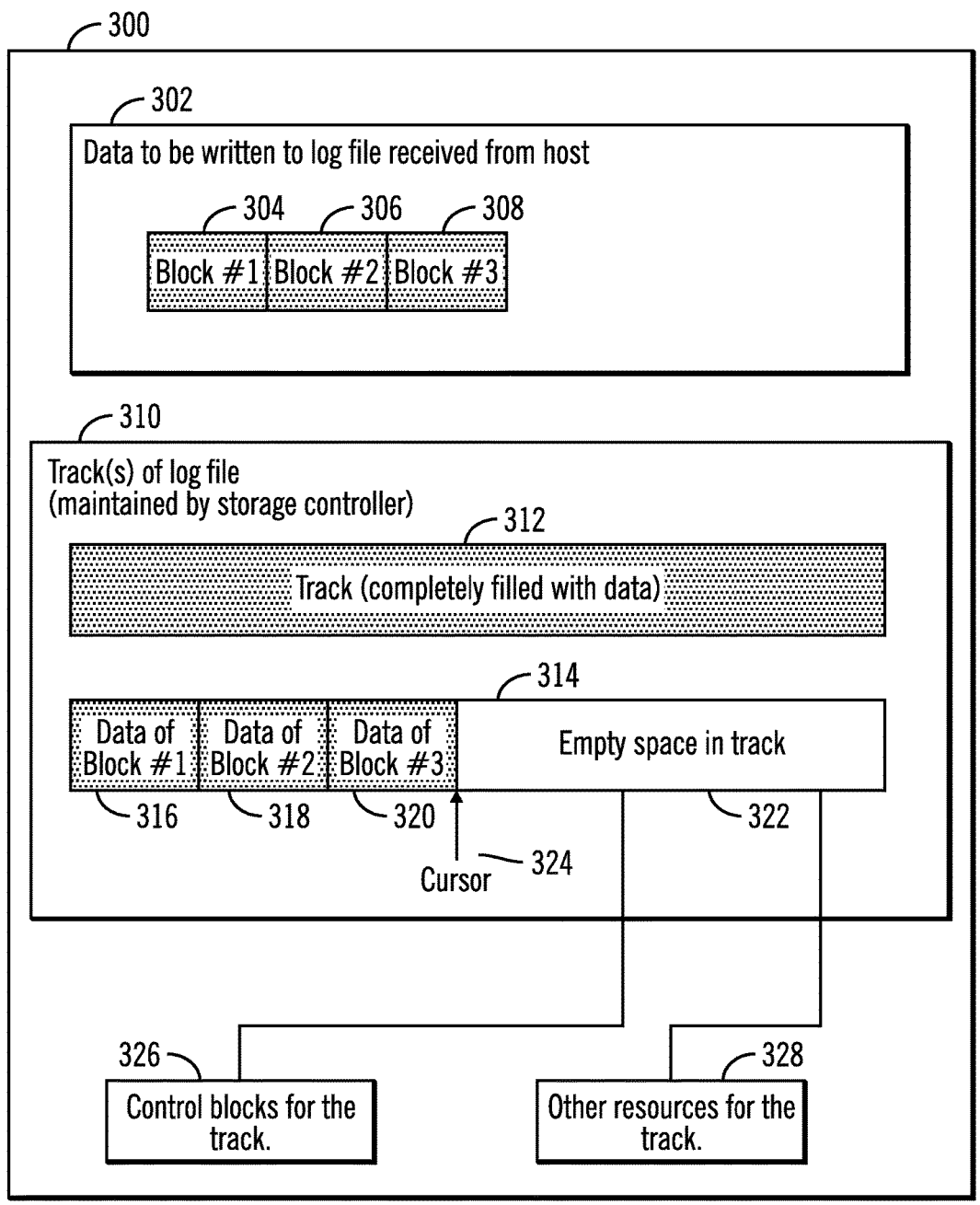
FIG. 3 illustrates a block diagram that shows reserving control blocks and resources of a track of a log file, in response to empty space in the track after data has been written to the log file, in accordance with certain embodiments.

FIG. 3 illustrates a block diagram 300 that shows reserving control blocks and resources of a track of a log file, in response to empty space in the track after data has been written to the log file 126, in accordance with certain embodiments.

The host 104 may write data 302 to the log file 126, where the data is represented in blocks 304, 306, 308. The storage controller 102 may maintain the log file 126 in tracks 310, where an exemplary track 312 is shown completely filled with data, and an exemplary track 314 is shown with data of blocks 304, 306, 308 (shown via reference numerals 316, 318, 320). The empty space 322 follows the location of the cursor 324 that indicates locations till which data is written in the track 314.

The storage controller 102 may maintain control blocks 326 and other resources 328 corresponding to the track 314, where the control block 326 and 328 may be used to reserve the track 314 with empty space 322 for subsequent write operations to the log file 126 from the host 104. As a result, time is saved because the track 314 with empty space does not have to be released and then again reacquired for writing.

Figure 4:
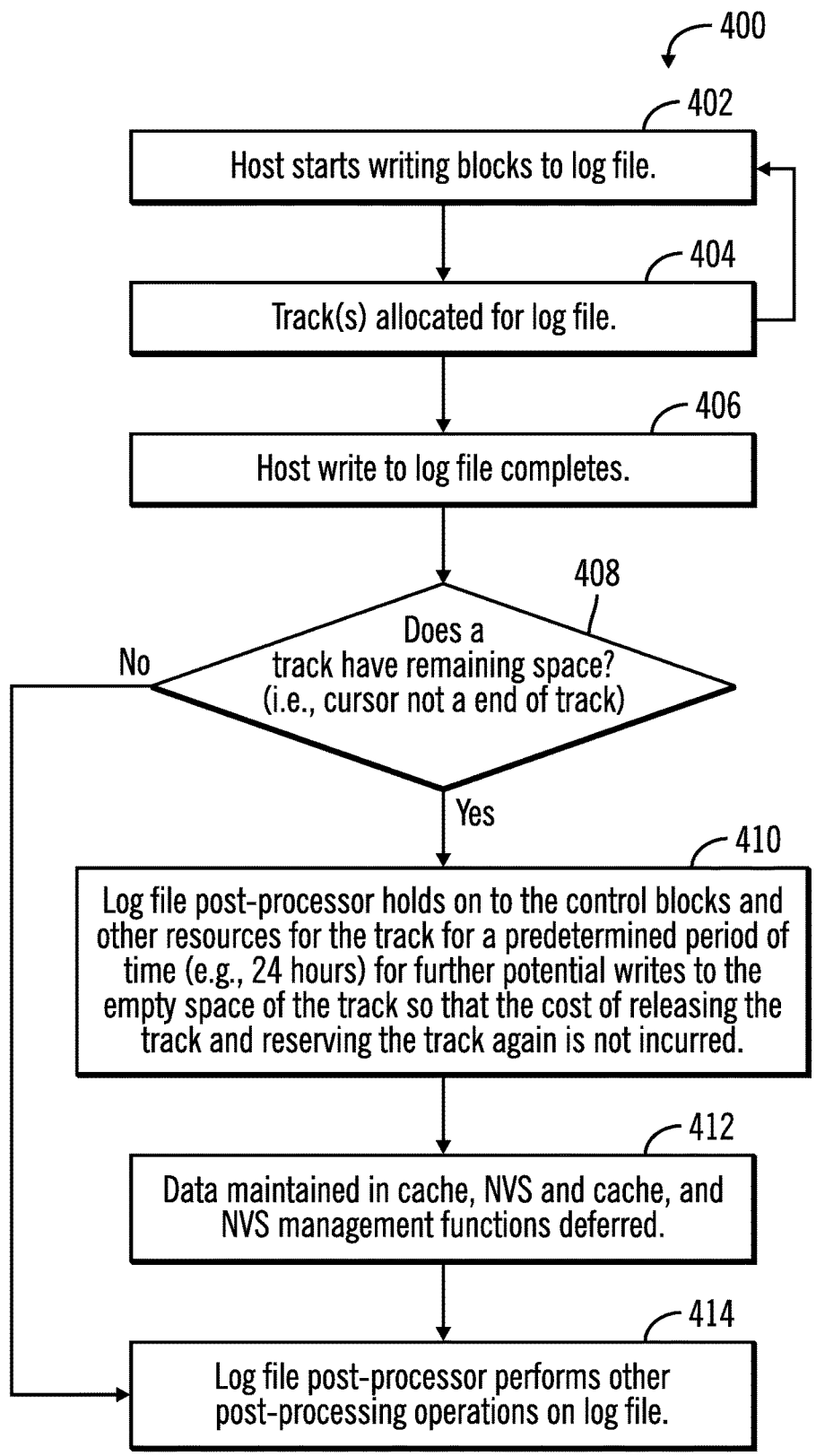
FIG. 4 illustrates a flowchart that shows operations for post-processing log files, in accordance with certain embodiments.

FIG. 4 illustrates a flowchart 400 that shows operations for post-processing log files, in accordance with certain embodiments. The operations shown in FIG. 4 may be performed by the storage management application 108 that executes in the storage controller 102.

Control starts at block 402 in which the host 104 starts writing blocks to the log file 126. The storage controller 102 allocates (at block 404) tracks for the log file 126 and control proceeds to block 402 for additional writes or to block 406 where the host writes to the log file 126 completes.

Control proceeds to block 408 from block 406, where in block 408 a determination is made as to whether a track 314 has remaining space 322. If so, additional data may be written to the track at a future time and it may be desirable not to release track 314 and avoid the overhead of release and reacquisition of the track. Therefore, in block 410 the log file post-processor 112 holds on to the control blocks 326 and other resources 328 for the track 314 for a predetermined period of time (e.g., 24 hours) for further potential writes to the empty space 322 of the track so that the cost of releasing the track and reserving the track again is not incurred. It should be noted that in many situations the log file post-processor 112 is not sure how many more blocks the host 104 will write in a subsequent write (e.g. in Count Key Data (CKD) writes where hints are not provided as opposed to Extended CKD (ECKD) writes where hints are provided). Even in such situations where the log file post-processor 112 is not sure how many more blocks the host 104 will write in a subsequent write, the log file post-processor 112 holds on to the control blocks 326 and other resources 328 for the track 314 for the predetermined period of time.

Control proceeds to block 412 where the data is maintained in the cache 118 and the NVS 120 and the NVS management functions may be deferred. The log file post-processor 112 then performs post-processing operations on the log file 126 (at block 414).

From block 408, if a determination is made that the track 314 has no remaining space then control proceeds to block 414 in which the log file post-processor 112 then performs post-processing operations on the log file 126.

Therefore, FIG. 4 illustrates certain embodiments in which a track that has remaining space is held (i.e., not released) when a write completes. The held track is reused in the event of a subsequent write from the host 104. As a result, the overhead associated with release and reacquisition of a track is avoided.

Figure 5:
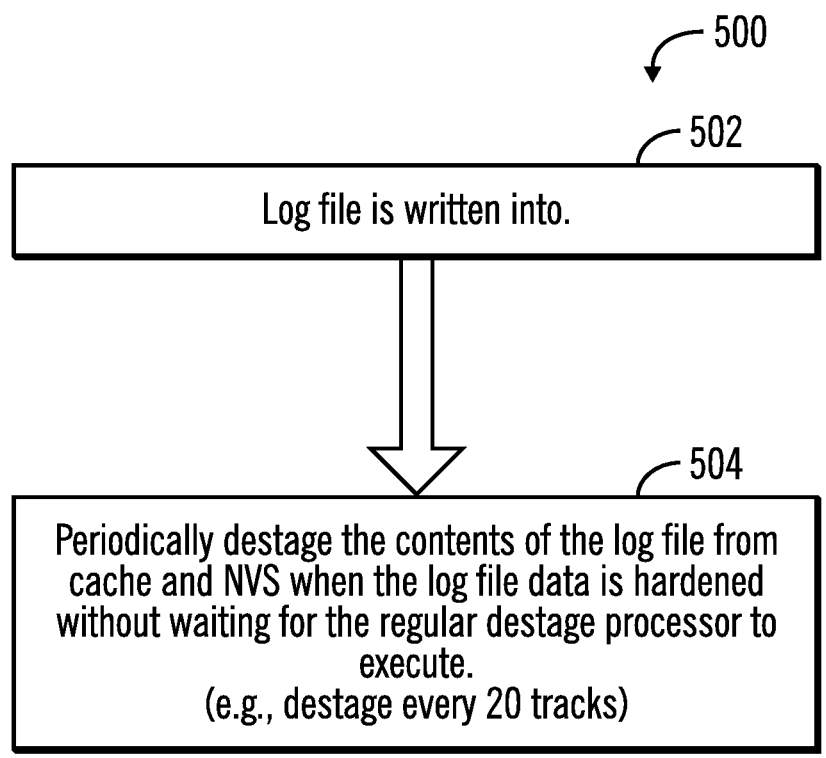
FIG. 5 illustrates a flowchart that shows periodic destages from the log file in accordance with certain embodiments.

FIG. 5 illustrates a flowchart 500 that shows periodic destages from the log file 126 in accordance with certain embodiments. The operations shown in FIG. 5 may be performed by the storage management application 108 that executes in the storage controller 102.

Control starts at block 502 where the log file 126 is written into. Control proceeds to block 504 where the log file post-processor 112 periodically destages the contents of the log file from the cache 118 and the NVS 120 when the log file data is hardened without waiting for the regular destage process 116 to execute. For example, destages from the log file 126 may be performed every twenty tracks in certain embodiments, In some embodiments, destage from the log file 126 is performed after writes to the log file are complete. In other embodiments, once the cursor 324 advances in the log file 126, destages from the log file 126 may be scheduled.

Figure 6:
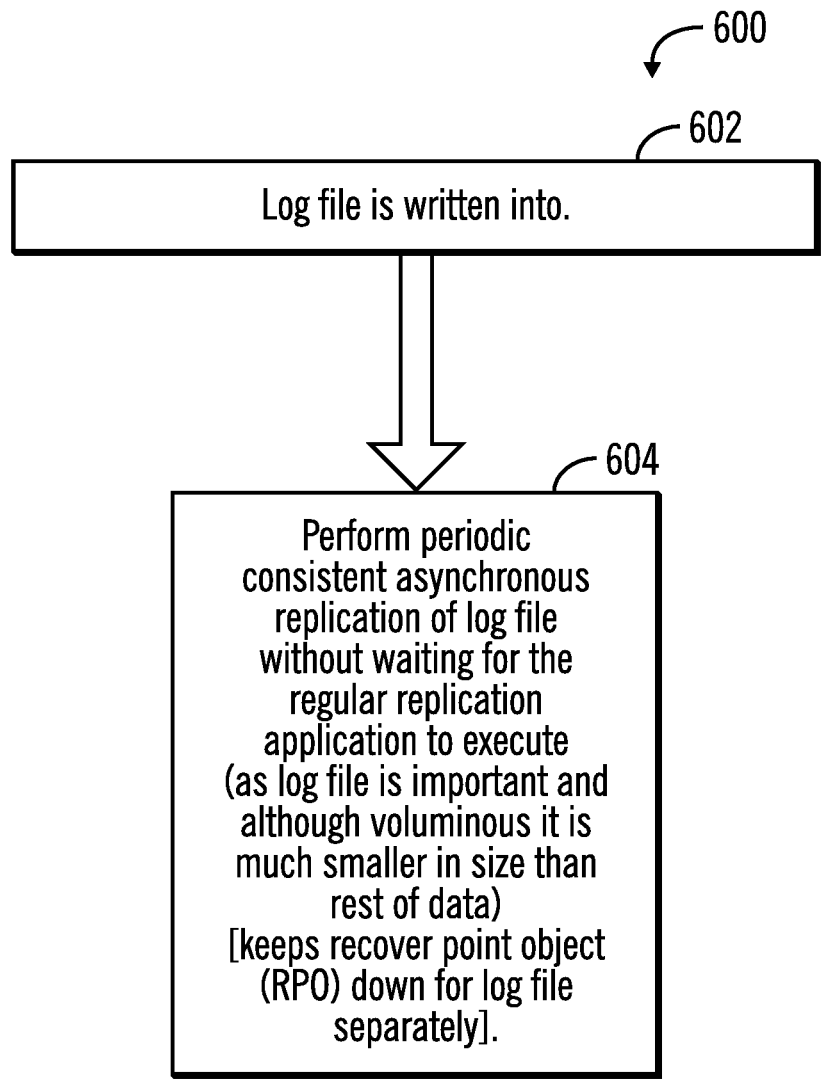
FIG. 6 illustrates a flowchart that shows periodic consistent asynchronous replication of the log file, in accordance with certain embodiments.

FIG. 6 illustrates a flowchart 600 that shows periodic consistent asynchronous replication of the log file 126, in accordance with certain embodiments. The operations shown in FIG. 6 may be performed by the storage management application 108 that executes in the storage controller 102.

Control starts at block 602 where the log file 126 is written into. Control proceeds to block 604 where the log file post-processor 112 performs periodic consistent asynchronous replication of the log file 126 without waiting for the regular replication application (such as the copy function modules 114) to execute. The asynchronous replication may copy the log file 126 asynchronously from the storage controller 102 to another storage controller (not shown). The log file is important and although voluminous it is much smaller in size than the rest of data. As a result, such replication keeps the recovery point object (RPO) down for log files in comparison to other elements of the storage controller 102.

The log file 126 is important in comparison to most other files. Therefore, in certain embodiments shown in FIG. 6 the log file 126 is replicated first. In other words, the storage controller 102 is more up to date on the log file 126 than on any generic data. Since the log file 126 may store the most important data, the post-processing operations replicate the log file without waiting for the regular replication of data in the storage controller 102 to a remote site. Often during replication only a differential remote copy of the log file is maintained prior to the copying of other data.

Figure 7:
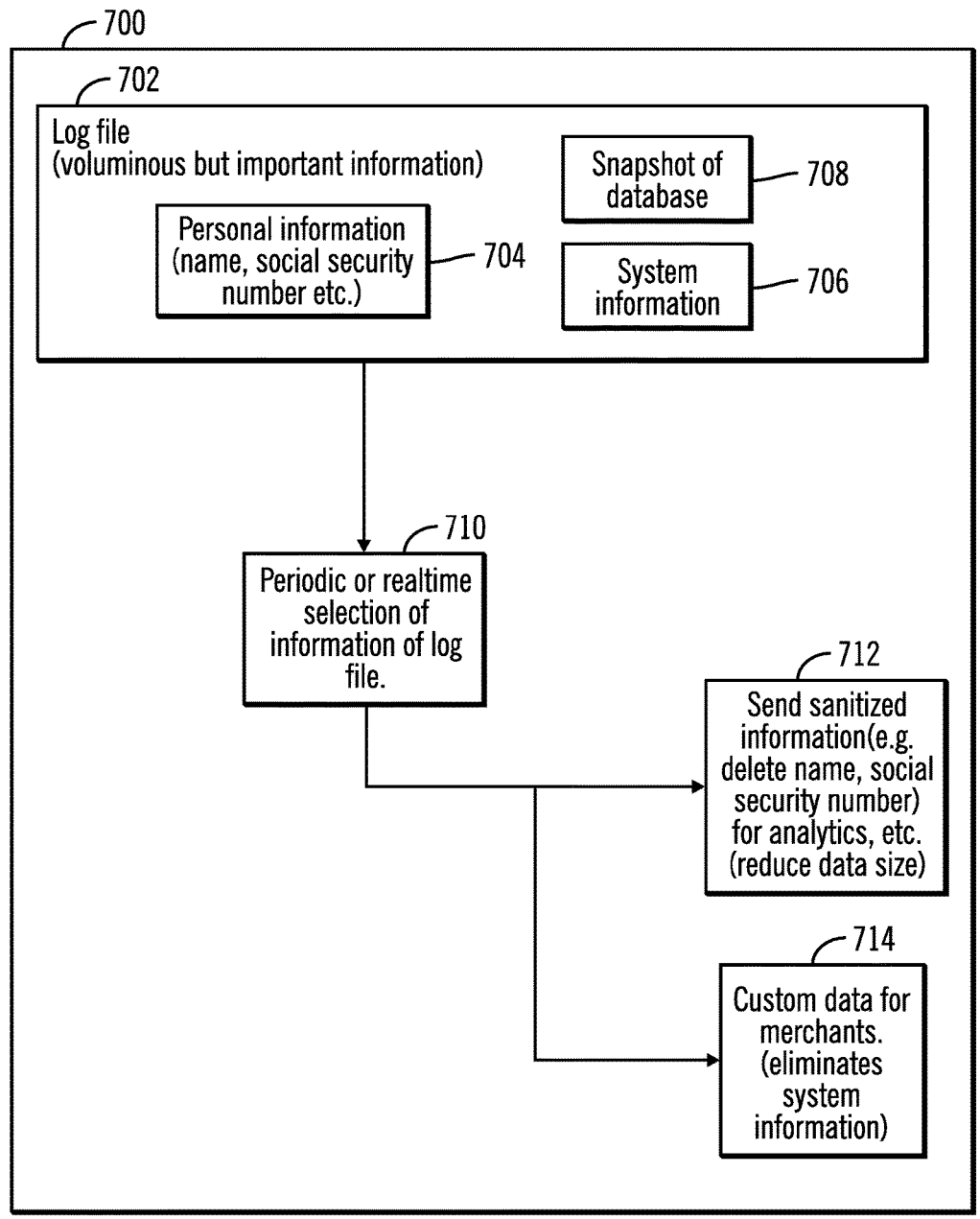
FIG. 7 illustrates a block diagram that shows periodic or real-time selection of information from the log file for further processing, in accordance with certain embodiments.

FIG. 7 illustrates a block diagram 700 that shows periodic or real-time selection of information from the log file for further processing, in accordance with certain embodiments.

An exemplary log file 702 may include voluminous but important information (including personal information 704 (e.g., name, social security number, etc., of customers), system information 706, snapshot of database 708, etc. Periodic or real time selection of information of the log file 702 is performed (at block 710) by the storage management application 108.

In certain embodiments the selection performed at block 710 may cause the sending of sanitized information that delete name, social security number, etc., for analytics (as shown in block 712).

In other embodiments, the selection performed at block 710 may cause the sending of custom data for merchants that eliminate the system information (as shown in block 714).

Therefore, FIG. 7 illustrates how depending on requirements various selections are made in the log files during the post-processing.

Figure 8:
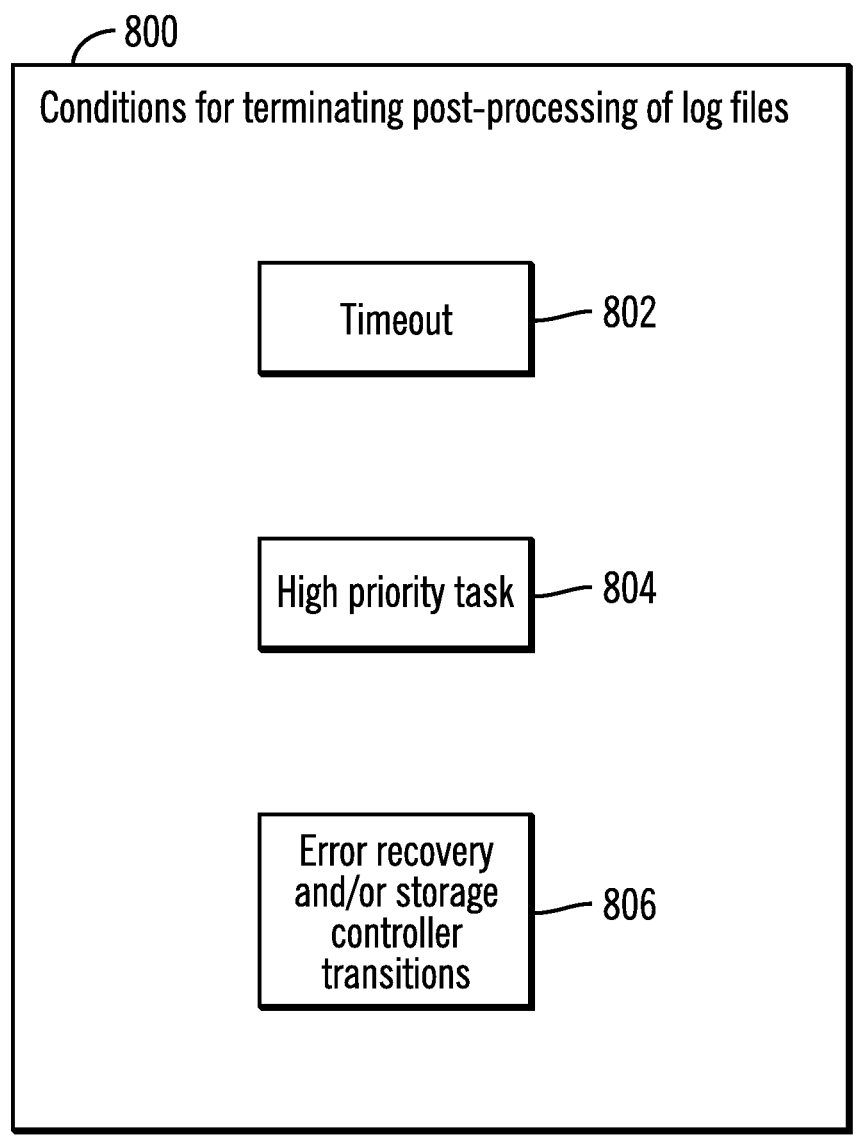
FIG. 8 illustrates a flowchart that shows conditions for terminating the post-processing of log files, in accordance with certain embodiments.

FIG. 8 illustrates a block diagram 800 that shows conditions for terminating the post-processing of log files, in accordance with certain embodiments For example, in a timeout condition 802, if a new host write is not received for a time period, the post-processing of log files is stopped in certain situations If a high priority task 804 needs access to a resource then log file post-processing is terminated. For example, asynchronous replication may require access to a track while forming a consistency group, and potentially other host or internal I/O (such as reads) may require access to the track. Error recovery and/or box (i.e. storage controller) transition conditions 806 such as warmstart, node quiesce/resume and box shut down may terminate the log file post-processing.

Figure 9:
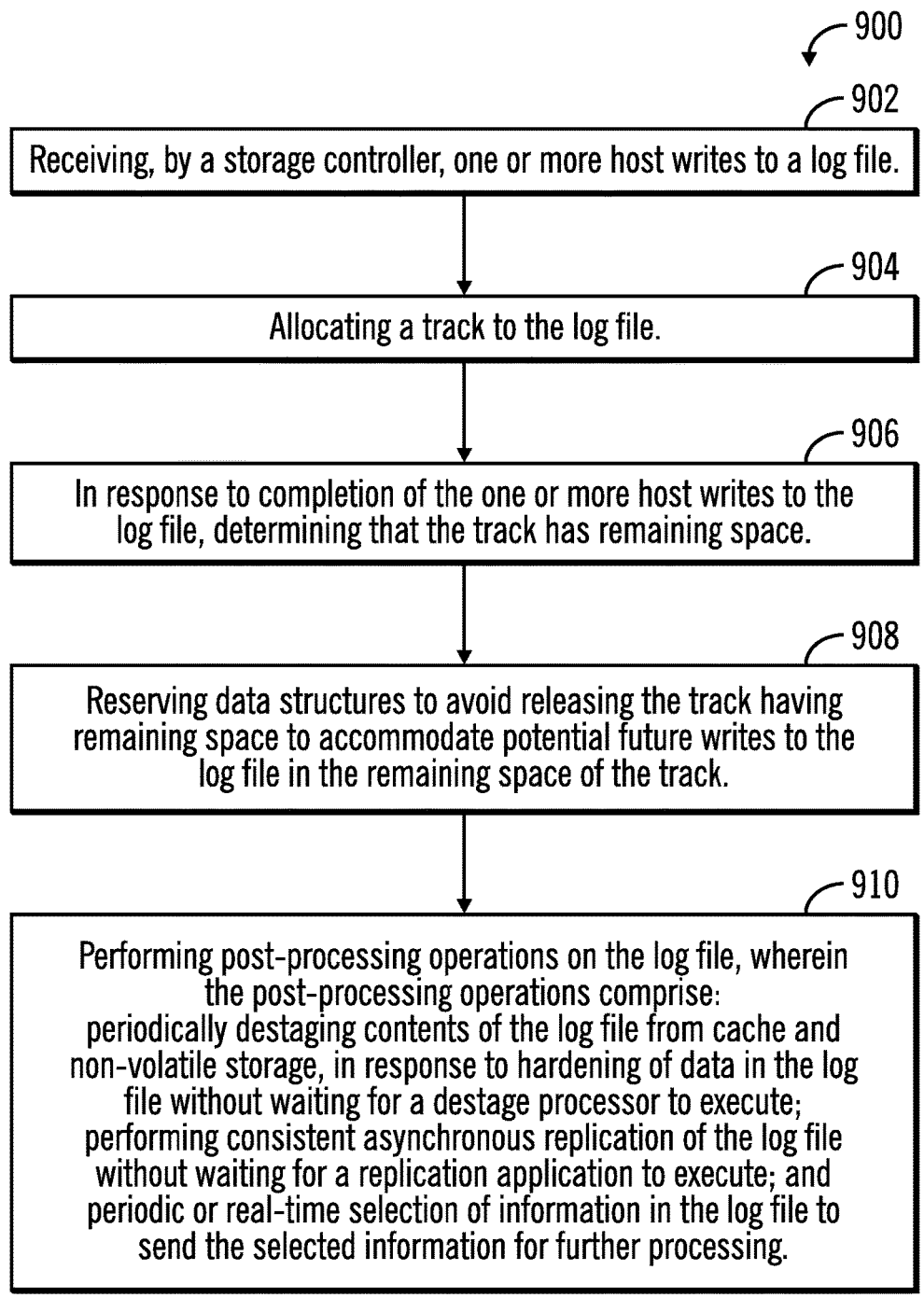
FIG. 9 illustrates a flowchart for post-processing of log files, in accordance with certain embodiments.

FIG. 9 illustrates a flow chart for post-processing of log files, in accordance with certain embodiments. The operations shown in FIG. 9 may be performed by the storage management application 108 that executes in the storage controller 102.

Control starts at block 902 in which a storage controller receives one or more host writes to a log file. A track is allocated (at block 904) to the log file 126. In response to completion of the one or more host writes to the log file 126, a determination is made that the track has remaining space (at block 906). Data structures are reserved (at block 908) to avoid releasing the track having the remaining space to accommodate potential future writes to the log file in the remaining space of the track. In certain embodiments, the data structures represent control blocks and other resources for the track. In further embodiments, the reserving is for a predetermined period of time.

In additional embodiments, control proceeds to block 910 in which post-processing operations are performed on the log file 126. In certain embodiments, the post-processing operations comprise periodically destaging contents of the log file from cache and non-volatile storage, in response to hardening of data in the log file without waiting for a destage processor to execute/In additional embodiments, the post-processing operations further comprise performing consistent asynchronous replication of the log file without waiting for a replication application to execute. In yet further embodiments, the post-processing operations further comprise periodic or real-time selection of information in the log file to send the selected information for further processing.

Therefore FIGS. 1-9 illustrate certain embodiments for the post-processing of log files.

EXAMPLES

In a first embodiment, a storage controller receives one or more host writes to a log file. A track is allocated to the log file. In response to completion of the one or more host writes to the log file, a determination is made that the track has remaining space. Data structures are reserved to avoid releasing the track having the remaining space to accommodate potential future writes to the log file in the remaining space of the track. As a result, the overhead of repeated release and reacquisition of tracks with empty space is avoided.

In a second embodiment, the subject matter of the first embodiment may include that the data structures represent control blocks and other resources for the track.

In a third embodiment, the subject matter of the first or the second embodiment may include that the reserving is for a predetermined period of time.

In a fourth embodiment, the subject matter of the first, the second, or the third embodiment may include that post-processing operations are performed on the log file.

In a fifth embodiment, the subject matter of the first, the second, the third, or the fourth embodiment may include that the post-processing operations comprise periodically destaging contents of the log file from cache and non-volatile storage, in response to hardening of data in the log file without waiting for a destage processor to execute. As a result, the cache and non-volatile storage may preferentially be destaged of the contents that are hardened in the log file.

In a sixth embodiment, the subject matter of the first, the second, the third, the fourth, or the fifth embodiment may include that the post-processing operations further comprise performing consistent asynchronous replication of the log file without waiting for a replication application to execute. As a result, the valuable data of the log file is replicated prior to other data.

In a seventh embodiment, the subject matter of the first, the second, the third, the fourth, the fifth or the sixth embodiment may include that the post-processing operations further comprise periodic or real-time selection of information in the log file to send the selected information for further processing. As a result, privacy of data may be assured and processes are not burdened with unnecessary data.

In an eighth embodiment, the subject matter of the first, the second, the third, the fourth, the fifth, the sixth or the seventh embodiment may include that the post-processing operations on the log file is terminated in response to the elapse of a predetermined amount of time; or if a task with a higher level of priority than the post-processor operations needs a resource that is locked by the post-processing operations; or in response to an error recovery or a transition of the storage controller. As a result, the post-processing operations do not unnecessarily prevent resources from being used by other processes in certain situations.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
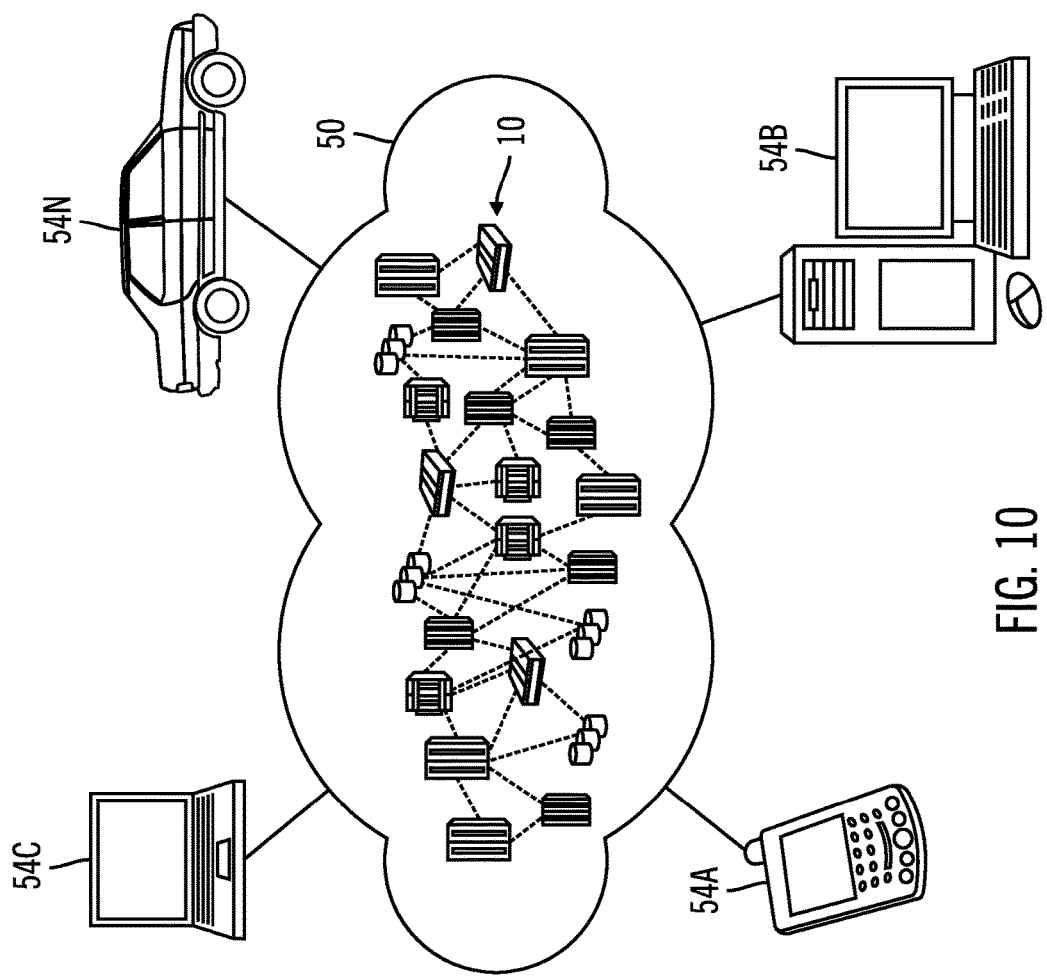
FIG. 10 illustrates a block diagram of a cloud computing environment, in accordance with certain embodiments.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
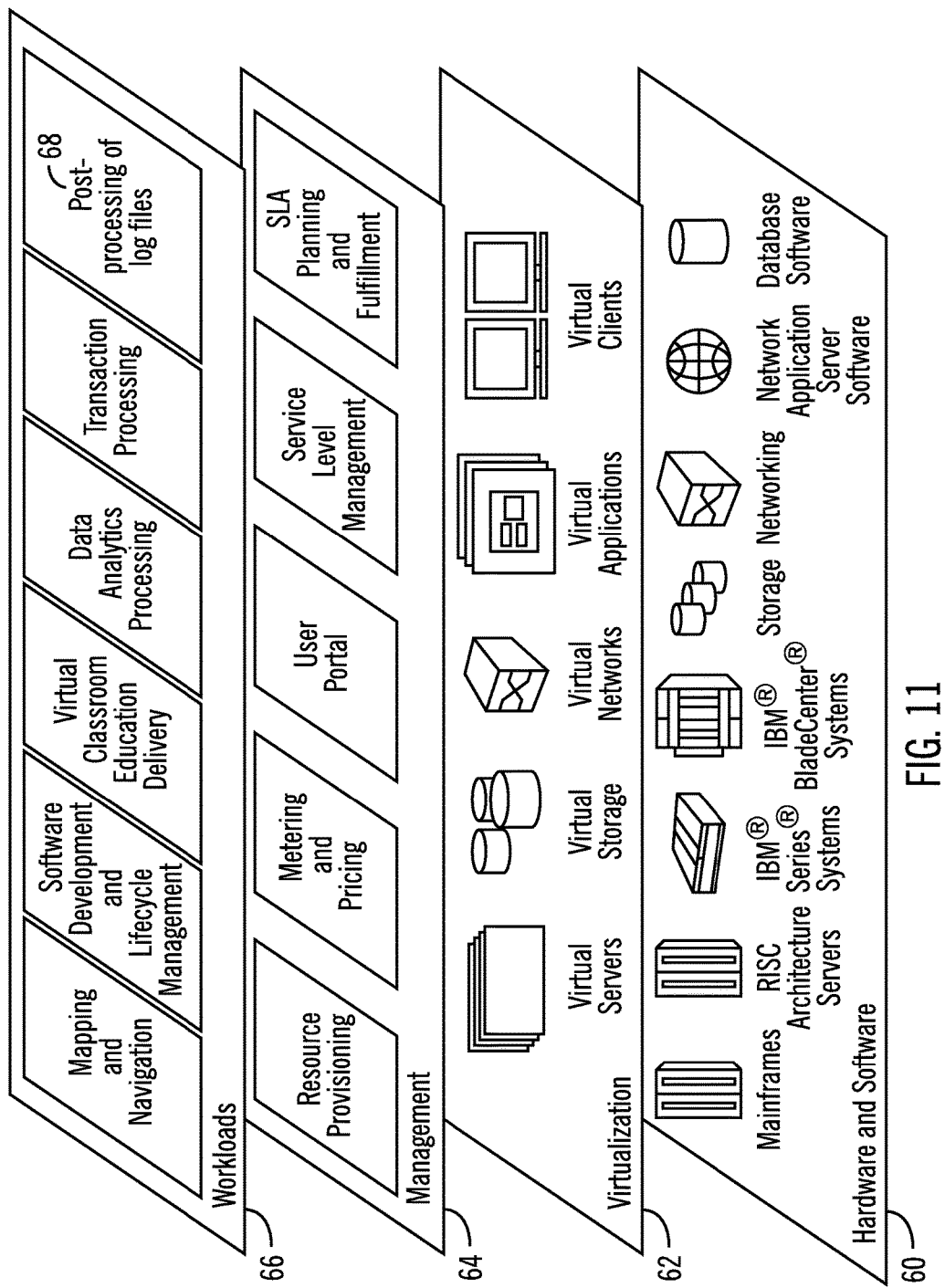
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the post-processing of log files 68 (e.g., in the storage management application 108) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
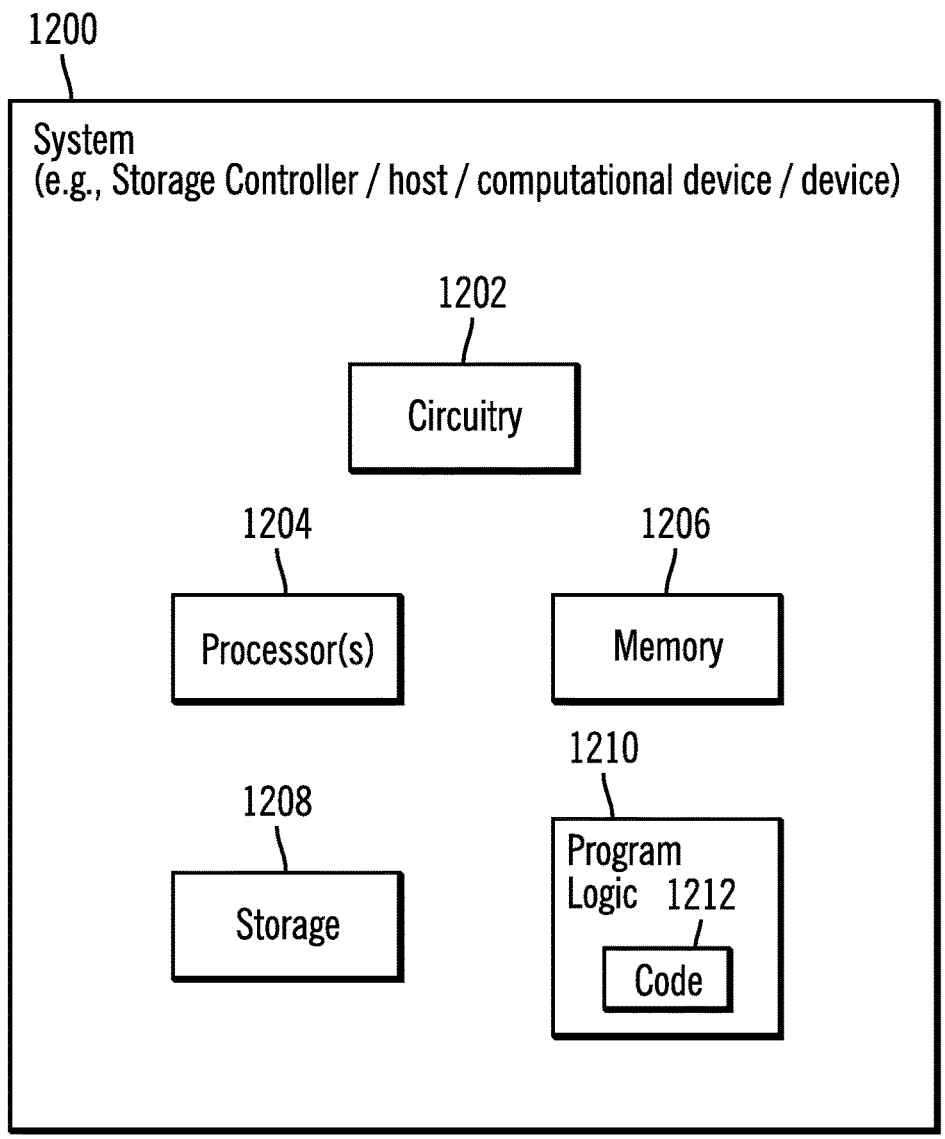
FIG. 12 illustrates a block diagram of a computational system that shows certain elements that may be included in the storage controller or the host shown in FIG. 1, in accordance with certain embodiments.

FIG. 12 illustrates a block diagram that shows certain elements that may be included in the host 104 or storage controller 102 in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   receiving, by a storage controller, one or more host writes to a log file;
   allocating a track to the log file;
   in response to completion of the one or more host writes to the log file, determining that the track has remaining space;
   reserving data structures to avoid releasing the track having the remaining space to accommodate potential future writes to the log file in the remaining space of the track;

performing post-processing operations on the log file to periodically destage contents of the log file from cache and non-volatile storage of the storage controller, in response to hardening of data in the log file, without waiting for a destage processor to execute in the storage controller; and terminating the post-processing operations on the log file, in response to determining that a task with a higher level of priority than the post-processing operations on the log file needs a resource that is locked by the post-processing operations on the log file.

2. The method of claim 1, wherein the post-processing operations further comprise periodic or real-time selection of information in the log file to send the selected information for further processing, wherein the selected information is generated by deleting personal information of customers.

3. A system, comprising:
a memory; and
a processor coupled to the memory, wherein the processor performs operations, the operations comprising:
receiving one or more host writes to a log file;
allocating a track to the log file;
in response to completion of the one or more host writes to the log file, determining that the track has remaining space;
reserving data structures to avoid releasing the track having the remaining space to accommodate potential future writes to the log file in the remaining space of the track;
performing post-processing operations on the log file to periodically destage contents of the log file from cache and non-volatile storage of the system, in response to hardening of data in the log file, without waiting for a destage processor to execute in the system; and
terminating the post-processing operations on the log file, in response to determining that a task with a higher level of priority than the post-processing operations on the log file needs a resource that is locked by the post-processing operations on the log file.

4. The system of claim 3, wherein the post-processing operations further comprise periodic or real-time selection of information in the log file to send the selected information for further processing, wherein the selected information is generated by deleting personal information of customers.

5. A computer program product, the computer program product comprising a computer readable storage medium having computer readable program code embodied therewith, the computer readable program code configured to perform operations, the operations comprising:
receiving, by a storage controller, one or more host writes to a log file;
allocating a track to the log file;
in response to completion of the one or more host writes to the log file, determining that the track has remaining space;
reserving data structures to avoid releasing the track having the remaining space to accommodate potential future writes to the log file in the remaining space of the track;
performing post-processing operations on the log file to periodically destage contents of the log file from cache and non-volatile storage of the storage controller, in response to hardening of data in the log file, without waiting for a destage processor to execute in the storage controller; and
terminating the post-processing operations on the log file, in response to determining that a task with a higher level of priority than the post-processing operations on the log file needs a resource that is locked by the post-processing operations on the log file.

6. The computer program product of claim 5, wherein the post-processing operations further comprise periodic or real-time selection of information in the log file to send the selected information for further processing, wherein the selected information is generated by deleting personal information of customers.

7. A storage controller coupled to one or more hosts, the storage controller comprising:
a cache;
a non-volatile storage;
a log file maintained in the storage controller; and
a storage management application maintained in the storage controller, wherein the storage management application performs operations, the operations comprising:
receiving one or more host writes to a log file;
allocating a track to the log file;
in response to completion of the one or more host writes to the log file, determining that the track has remaining space;
reserving data structures to avoid releasing the track having the remaining space to accommodate potential future writes to the log file in the remaining space of the track;
performing post-processing operations on the log file to periodically destage contents of the log file from the cache and the non-volatile storage of the storage controller, in response to hardening of data in the log file, without waiting for a destage processor to execute in the storage controller; and
terminating the post-processing operations on the log file, in response to determining that a task with a higher level of priority than the post-processing operations on the log file needs a resource that is locked by the post-processing operations on the log file.

8. The method of claim 1, wherein destages from the log file are performed after writes to the log file are complete, and once a cursor advances in the log file then destages from the log file are scheduled.

9. The system of claim 3, wherein destages from the log file are performed after writes to the log file are complete, and once a cursor advances in the log file then destages from the log file are scheduled.

10. The computer program product of claim 5, wherein destages from the log file are performed after writes to the log file are complete, and once a cursor advances in the log file then destages then from the log file are scheduled.

11. The storage controller of claim 7, wherein destages from the log file are performed after writes to the log file are complete, and once a cursor advances in the log file then destages from the log file are scheduled.

12. The method of claim 1, the method further comprising:
terminating the post-processing operations on the log file also in response to an asynchronous replication process requiring access to the track while forming a consistency group.

13. The method of claim 12, the method further comprising:
terminating the post-processing operations on the log file also in response to an elapse of a predetermined amount of time in which a new host write is not received by the storage controller.

14. The method of claim 1, wherein the post-processing operations on the log file performs an asynchronous replication of log file prior to a replication of data from the storage controller to a remote site.

15. The system of claim 3, the operations further comprising:
terminating the post-processing operations on the log file also in response to an asynchronous replication process requiring access to the track while forming a consistency group.

16. The system of claim 15, the operations further comprising:
terminating the post-processing operations on the log file also in response to an elapse of a predetermined amount of time in which a new host write is not received by the system.

17. The system of claim 3, wherein the post-processing operations on the log file performs an asynchronous replication of log file prior to a replication of data from the system to a remote site.

18. The computer program product of claim 5, the operations further comprising:
terminating the post-processing operations on the log file also in response to an asynchronous replication process requiring access to the track while forming a consistency group.

19. The computer program product of claim 18, the operations further comprising:
terminating the post-processing operations on the log file also in response to an elapse of a predetermined amount of time in which a new host write is not received by the storage controller.

20. The computer program product of claim 5, wherein the post-processing operations on the log file performs an asynchronous replication of log file prior to a replication of data from the storage controller to a remote site.

21. The storage controller of claim 7, the operations further comprising:
terminating the post-processing operations on the log file also in response to an asynchronous replication process requiring access to the track while forming a consistency group.

22. The storage controller of claim 21, the operations further comprising:
terminating the post-processing operations on the log file also in response to an elapse of a predetermined amount of time in which a new host write is not received by the storage controller.

23. The storage controller of claim 7, wherein the post-processing operations on the log file performs an asynchronous replication of log file prior to a replication of data from the storage controller to a remote site.

24. The storage controller of claim 7, wherein the post-processing operations further comprise periodic or real-time selection of information in the log file to send the selected information for further processing, wherein the selected information is generated by deleting personal information of customers.

* * * * *